May 2, 1939.　　　C. L. GUYMAN　　　2,156,452
TRAWLING SIGNAL
Filed Nov. 23, 1935　　　3 Sheets-Sheet 1
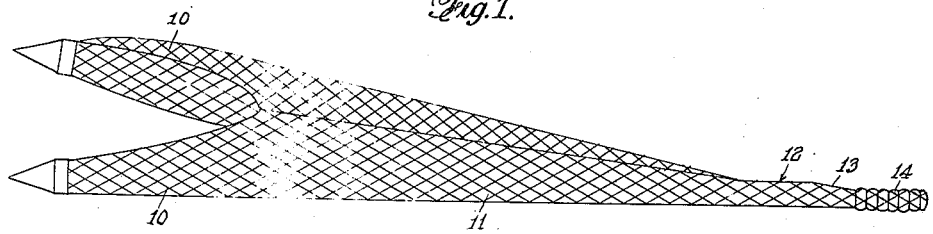
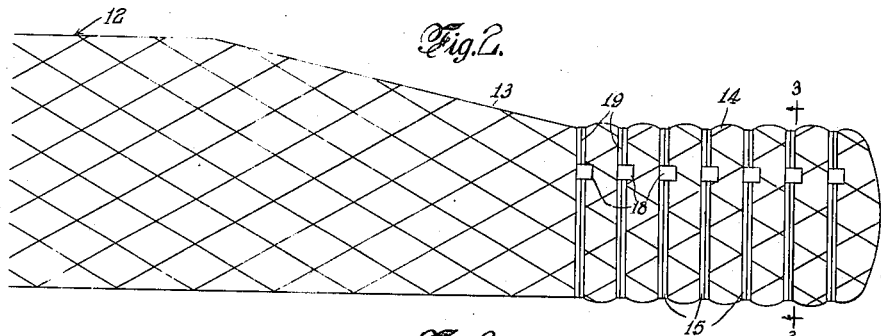
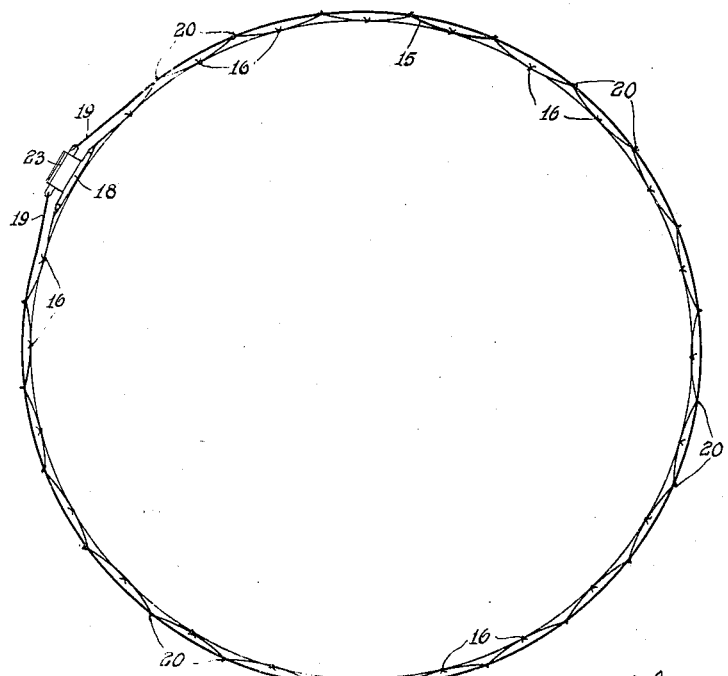
Clarence L. Guyman INVENTOR.
BY Wm. S. Pritchard ATTORNEY.

May 2, 1939.  C. L. GUYMAN  2,156,452
TRAWLING SIGNAL
Filed Nov. 23, 1935    3 Sheets-Sheet 2
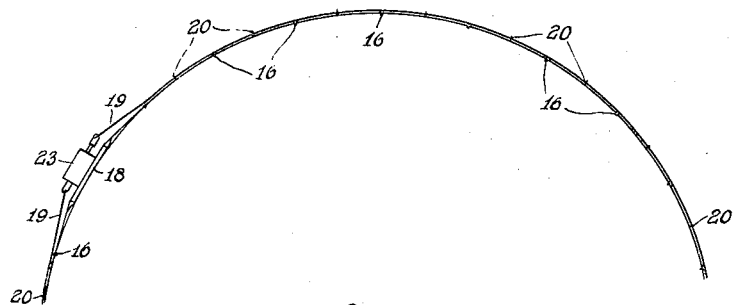
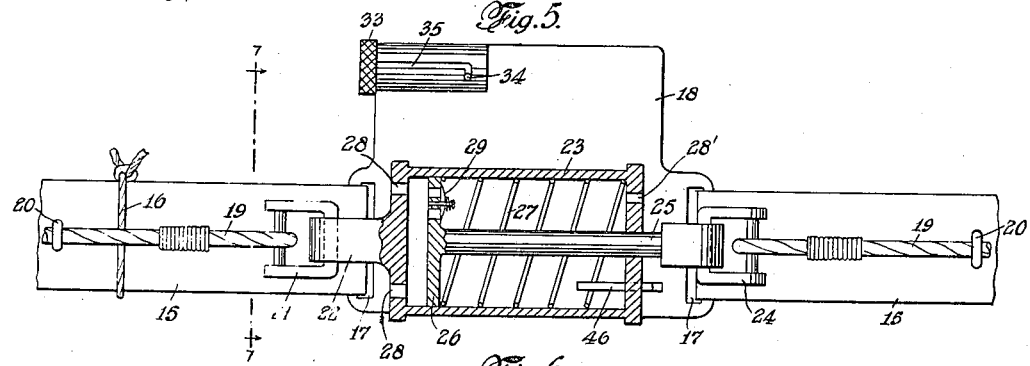
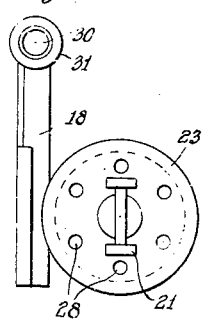
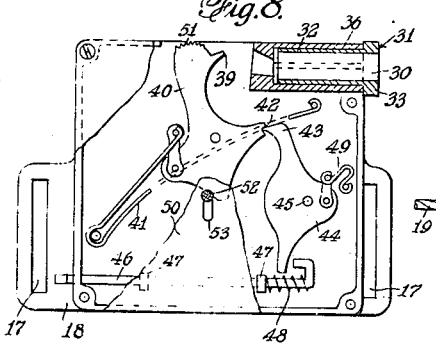
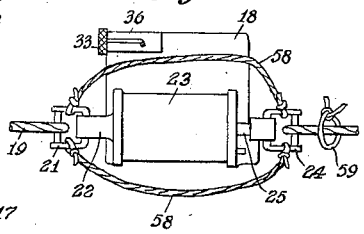
INVENTOR.
Clarence L. Guyman
BY Wm. S. Pritchard
ATTORNEY May 2, 1939. C. L. GUYMAN 2,156,452
TRAWLING SIGNAL
Filed Nov. 23, 1935 3 Sheets-Sheet 3
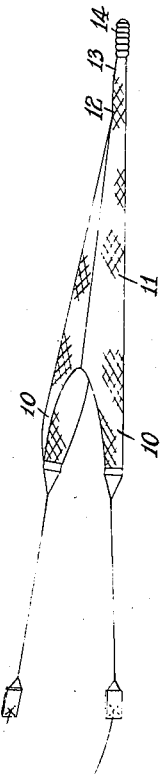
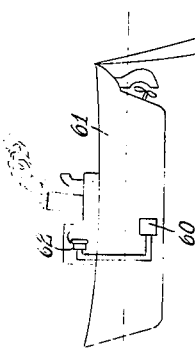
Fig.10.
Clarence L. Guyman INVENTOR.
BY Wm. S. Pritchard ATTORNEY.

Patented May 2, 1939

2,156,452

UNITED STATES PATENT OFFICE 2,156,452

TRAWLING SIGNAL

Clarence L. Guyman, Great Neck, N. Y., assignor to The Atlantic Coast Fisheries Company, New York, N. Y., a corporation of Maine Application November 23, 1935, Serial No. 51,198

23 Claims. (Cl. 43—9)

This invention relates to net fishing, and more particularly to trawling of the type in which a generally funnel-shaped net, tapering to a receiver commonly called a "cod-end", is towed through the water by a boat known as a "trawler".

In this type of fishing, it is usual to haul in the net after a run of several miles to remove the fish therefrom and to examine the net for tears or the like. It is only when the net is hauled in that the presence of fish is ascertained. Hence, there is no means of determining the exact location of any school of fish that may have been encountered, and much time may be lost in trawling through unproductive areas.

An object of the present invention is to provide means for indicating the approximate amount of fish in the net throughout the towing operation.

Another object is to provide a signal system for indicating the rate at which the net is filled.

Another object is to provide a system of the above type which does not interfere with the usual operations involved in setting and hauling in the net.

A further object is to provide a simple, convenient and dependable device for the purpose specified.

A feature of the invention consists in the provision of means on the net to produce a signal when a predetermined quantity of fish has been caught in the net, and of means on the trawler to pick up the signal, either audibly or visually.

In one embodiment, a plurality of tension cables are disposed about the cod-end of the net in such position that pressure is exerted on the successive cables as the quantity of fish in the net increases. Means is provided whereby an explosive charge is set off when a predetermined pressure is exerted on each tension cable. Consequently, in normal operation, the charges will be progressively fired as the net fills with fish and the approximate quantity of fish may be ascertained from an indication of the number of charges which has been set off at any selected time.

The explosions cause sound waves to travel through the water which are picked up by a hydrophone, which may be located in a convenient position in the hull of the trawler and may be connected to a suitable listening or indicating mechanism, such as a head-phone, loudspeaker, or a recording chart.

Other features consist in the various details of construction and combinations of parts hereinafter more fully set forth.

Although the novel features which are believed to be characteristic of this invention will be pointed out more particularly in the claims appended hereto, the invention itself as to its objects and advantages and the manner of its operation will be better understood by referring to the following description, taken in connection with the accompanying drawings forming a part thereof, in which:

Figure 1 is a perspective view of an otter trawl embodying the present invention;

Figure 2 is an enlarged detail view showing the cod-end of the otter trawl;

Figure 3 is a transverse section through the cod-end taken on the line 3—3 of Figure 2;

Figure 4 is a partial section similar to Figure 3 showing the band in extended position;

Figure 5 is a top plan view of a band, tension cable, and signal mechanism;

Figure 6 is a side elevation thereof;

Figure 7 is an end elevation of the signal mechanism;

Figure 8 is a bottom plan view of the signal mechanism with the cover plate broken away;

Figure 9 is a top plan view of a modified form of signal mechanism; and

Figure 10 is a diagrammatic view of the system including the net, trawler and signal-receiving means on the trawler.

In the following description and in the claims, certain specific terms are used for convenience in referring to various details of the invention. These terms, however, are to be given as broad as interpretation as the state of the art will permit.

Referring more particularly to the drawings, there is shown an otter trawl comprising a net having side wings 10, a tapered body 11, and a cod-end 12. Inasmuch as this net is of the general construction commonly employed, it will not be described in detail. Furthermore, it is to be understood that the invention is applicable to other types of nets and is not to be restricted to the particular form disclosed.

The cod-end 12 is provided with a tapered section 13 and a cylindrical section 14 which is of smaller diameter than the end of the tapered body 11. The cylindrical section 14 constitutes a receiver in which the fish collect and is closed at its end by a pursing rope (not shown), commonly called a cod-end rope. The purpose of the cod-end rope is to open the end of the net after the same has been hoisted aboard the trawler so as to permit the fish to be removed therefrom.

The cylindrical portion 14 of the cod-end is shown as encompassed by a plurality of spaced bands 15. Each band 15 is secured to the net at frequent intervals by suitable means, such as tie ropes 16 (Figures 3, 4 and 5), which are made sufficiently tight to prevent displacement of the band 15 without interfering with free movement of the tension cable to be described. Each band 15 is secured at its ends to attaching slots 17 in a base 18 (Figures 5 and 6).

A tension cable 19 extends along each band 15 and is slidably secured thereto at intervals by loops or rings 20. One end of the tension cable 19 is secured by a shackle 21 to a support 22 formed on a cylinder 23 which is mounted on the base 18. The other end of the tension cable 19 is secured by a shackle 24 to a piston rod 25 which operates a piston 26 in the cylinder 23. A compression spring 27 opposes the pull of the tension cable 19 on the piston 26 for preventing movement of the piston until a predetermined pressure is applied to the tension cable.

The cylinder 23 is preferably open to the sea water so as to form a dash-pot to prevent actuation of the apparatus, to be described, by a sudden pull which might be the result of striking a foreign object, such as a rock. For this purpose, the ends of the cylinder 23 may be provided with apertures 28 and 28', respectively, to admit sea water to or expel it from the cylinder, and the piston 26 may be provided with a flap valve 29 which opens to permit passage of water when the piston is returned by the spring 27. In this way the piston moves slowly in response to a pull on the tension cable 19 and returns more rapidly when the pull is interrupted. The mechanism is accordingly actuated only in response to a steady continuous pull, such as that produced by a mass of fish in the cod-end, and is not affected by a sudden jerk which might be the result of the band striking a foreign object, such as a rock or the like, when towing on rough bottom. Obviously, the opening 28' of the cylinder 23 to the sea water may be varied to adjust the timing of the dash-pot mechanism as desired.

The base 18 carries an explosive charge, such as a blank cartridge 30, which is held in a cartridge holder 31. The cartridge holder 31 comprises a tubular member 32 having a knurled flange 33 and a pin 34, the pin seating in a bayonet slot 35 formed in a housing 36 which is adapted to receive the cartridge holder 31. The housing 36 is sufficiently strong to withstand the force of the explosion of the cartridge 30.

The cartridge 30 is adapted to be fired by a firing pin 39 which is carried upon a hammer 40 and is adapted to be actuated by a spring 41 which tends to force the firing pin 39 into contact with the detonating mechanism of the cartridge 30.

The hammer 40 is provided with a notch 42 which is adapted to seat on the end 43 of a trigger 44 for normally holding the pin 39 away from the cartridge 30. The trigger 44 is pivoted at 45 and is adapted to be actuated by a link 46 which is slidably held in loops 47 and extends within the cylinder 23 into a position to be actuated by the piston 26 when the latter nears the end of its stroke. A spring 48 normally holds the link 46 out of contact with the trigger 44.

A spring 49 holds the trigger 44 in engagement with the hammer 40. The hammer 40, housing 36, trigger 44 and associated mechanism are carried by the base 18 and may be protected by a cover plate 50. They are preferably mounted below the base 18 so as to prevent damage due to accidental contact with foreign objects.

The hammer 40 may have a knurled top 51 extending beyond the edge of the base 18 for engagement with the thumb for setting the firing mechanism. A safety pin 52 may extend through a slot 53 in the cover and may be slidably mounted to engage the hammer 40 to prevent accidental firing during adjustment of the mechanism.

The bands 15 may be wrapped around the cylindrical portion 14 of the cod-end 12 at predetermined points and secured to the base 18 as above described. The ends of each tension cable 19 are then secured to the shackles 21 and 24 in such manner that an excess of tension on the tension cable will cause the same to exert a pull on the piston rod 25 sufficient to cause the link 46 to actuate the trigger 44 for firing the explosive charge.

The tension cable 19 is adjusted so that the adjacent portion of the cod-end of the net is slightly compressed thereby, as shown in Figure 3, so that the pressure of fish in the cod-end is transmitted to the tension cable. The base 18 and associated mechanism are preferably located at the top of the net so that it will not be injured by contact with the ocean bed as the net is drawn thereover.

In the operation of this device, the movement of the net through the water causes the same to swell out into a substantially cylindrical form, slightly compressed at the various tension cables, as indicated in Figures 2 and 3. As fish accumulate in the net, they collect in the cod-end and progressively fill the same. As each portion of the cod-end becomes full, the fish exert pressure, tending to distend the net, as shown in Figure 4, and to cause the tension cables to exert sufficient pull upon the firing mechanism to set off the explosive charge. The charge in each case is, of course, selected so that it will be audible to a suitable receiver, such as a hydrophone 60 located on the trawler 61. Consequently, when the first explosion is heard, it can be assumed that the net is full to the point of the first tension cable. As successive explosions are heard, it indicates that the net is progressively filled to the successive tension cables. Knowing the size of the net and the spacing of the tension cables, the quantity of fish in the net at any moment can be readily ascertained.

The different charges may be of different characteristics, if desired, to facilitate identification and to indicate if the charges do not explode in the normal sequence. It is obvious that the number and spacing of the tension cables may be varied according to the indications which are required in any particular instance. It is also obvious that the size and shape of the cod-end may likewise be varied as desired and that the cables may be located in other positions. In certain instances a cable may be arranged longitudinally around the end of the net for receiving a pull determined by the quantity of fish in the net.

The firing mechanism is easily set and the cartridge 30 may be replaced by first removing the cartridge holder 31 from the housing 36. The knurled flange 33 and bayonet slot 35 facilitate this operation. The end of the cartridge 30 preferably extends to the end of the housing 36 so as to prevent an air pocket from forming which would interfere with the propagation of the sound of the explosive through the water.

The band 15 is of a length such that it takes the strain from the tension cable 19 after the firing operation, thereby preventing injury to the firing apparatus due to an excessive pull on the tension cable. Other suitable stop means could, of course, be substituted therefor.

In the modification shown in Figure 9, the band 15 is omitted and the cylinder 23 is fastened to the net by any suitable means. In this embodiment, lazy pennants 58 are provided which extend between the shackles 21 and 24 to limit the movement of the piston and to act as a stop means therefor. Obviously, they may be connected to other parts of the apparatus if desired. The band 15 may be omitted in instances where other stop means and other securing means are provided, in which case the tension cable 19 may be secured directly to the net, as by loops 59.

It is to be understood that the invention is not restricted to the specific firing mechanism which has been shown merely for purposes of illustration, since it is obvious that various other indicating means may be substituted therefor.

The hydrophone 60 may be of any standard construction, such as those commonly used for depth calculations. It may be connected to an ear-phone 62 for listening to the detonation of the explosive charges or it may be connected to an indicating chart (not shown) for giving a visible record thereof. If an indicating chart is used, means is preferably included for indicating the times of setting and of hauling in the net so that the relative location of the schools of fish can be more readily calculated.

A device of this type is particularly useful in trawling through waters where the fish are concentrated in schools, as it gives an indication on the trawler when a school of fish is encountered and permits the trawler to be turned around for re-passing through the school of fish instead of continuing for many miles in unproductive waters. A considerable portion of the trawling time may thus be saved.

It is obvious that the invention is not to be limited to the specific embodiments above set forth, but that various changes and modifications may be made therein by a person skilled in the art. The invention is only to be limited in accordance with the following claims when interpreted in view of the prior art.

I claim:

1. In a trawling net, a tapered body portion, a cod-end communicating therewith, and means carried by the cod-end to produce a signal when the cod-end has accumulated a predetermined quantity of fish.

2. In a trawling net, a tapered body portion, a cod-end communicating therewith, and means carried by the cod-end to propagate a set of signals indicating the progressive filling of the cod-end.

3. A trawling net comprising a tapered body portion, a substantially cylindrical end communicating therewith in which the fish accumulate, and tension cables disposed at intervals along said cylindrical portion and adapted to successively receive pressure in response to the progressive filling of said cylindrical portion.

4. A trawling net, comprising a tapered body portion terminating in a substantially cylindrical receiving section, a tension cable associated with said receiving section, and means associated with said tension cable whereby pressure exerted thereon due to the filling of the net actuates a signaling device.

5. A trawling net comprising a tapered body portion terminating in a substantially cylindrical receiving section, a tension cable associated with said receiving section, a signaling device, and means whereby pressure exerted on said tension cable due to the filling of the net actuates said signaling device.

6. A trawling net comprising a tapered body portion terminating in a substantially cylindrical receiving section, a tension cable associated with said cylindrical section, means whereby the presence of a quantity of fish adjacent said cable increases the tension thereof, and a signaling device actuated in response to such increase in tension of said cable.

7. A trawling net comprising a tapered body portion terminating in a substantially cylindrical receiving section, a tension cable associated with said cylindrical section, means whereby the presence of a quantity of fish adjacent said cable increases the tension thereof, a signaling device containing an explosive charge associated with said cable, and means to detonate said charge in response to such increase in tension of said cable.

8. A trawling net comprising a tapered body portion having a cod-end, the forward part of which is tapered from the point of junction with said body portion and the rear part of which is substantially cylindrical and of lesser diameter than said forward part, a tension cable encompassing said cylindrical portion, said cable being of less circumference than the cylindrical portion when under the flow of water incidental to towing, whereby pressure is exerted on said cable due to the filling of said cod-end with fish to a point corresponding to the position thereof, and means responsive to a change in tension of said cable for propagating a signal.

9. In a trawling net, means constricting a portion of said net whereby pressure is exerted on said means due to pressure of a quantity of fish within said net, a signaling device, and means responsive to an increase in tension of said constricting means to actuate said signaling device.

10. In combination, a tension cable, a cylinder and piston arranged to receive the pull of said cable, a cartridge holder, a housing adapted to receive the same, and firing means actuated by movement of said piston for firing a charge in said cartridge holder.

11. In combination, a cartridge holder, a housing adapted to receive the same, a bayonet slot and pin associated with the housing and cartridge holder respectively for releasably securing the cartridge holder in said housing and a knurled flange on said cartridge holder projecting beyond said housing to facilitate removal of said cartridge holder.

12. A system of trawling comprising, in combination, a trawling net having a tapered body portion and a cod-end, means associated with said cod-end to propagate a signal when a predetermined quantity of fish has been collected therein, a trawler adapted to tow said net through the water, and signal-receiving means carried by said trawler, said receiving means being adapted to receive signals propagated by said signal-propagating means, and means for rendering the received signal intelligible.

13. A system of trawling comprising, in combination, a trawling net having a tapered body portion and a receiving section adapted, when towed through the water, to collect fish, a trawler adapted to tow said net, means carried by said net to propagate an audible signal when a predetermined quantity of fish has been collected thereby, and a hydrophone carried by said trawler adapted to receive said signal and to render the same intelligible.

14. A system of trawling comprising, in combination, a trawling net having a tapered body portion and a receiving section adapted, when towed through the water, to collect fish, a trawler adapted to tow said net, means carried by said net to detonate an explosive charge when a predetermined quantity of fish has been collected therein, and a hydrophone carried by said trawler and adapted to receive sound energy propagated through the water by detonation of said charge.

15. The method of indicating the quantity of fish in a trawling net which comprises causing signals to be propagated from said net as the same is progressively filled, and receiving said signals at a remote point.

16. The method of trawling which comprises towing a trawling net behind a trawler, causing signals to be propagated when said net is filled to a predetermined point, and receiving said signals on said trawler.

17. The method of trawling which comprises towing a trawling net behind a trawler, detonating an explosive charge at a point adjacent said net when the same is filled at a predetermined point, whereby sound waves are propagated through the water, and receiving said sound waves on said trawler.

18. The method of trawling which comprises towing a trawling net and causing a series of explosive charges to be progressively set off as the quantity of fish collected thereby increases.

19. The method of trawling which comprises towing a trawling net and causing a series of signals to be propagated as the quantity of fish collected thereby increases.

20. The method of indicating the quantity of fish in a net which comprises constricting a portion of the net in such manner that the fish therein exert pressure on the constricting means, and causing the pressure thus exerted to actuate a signaling device.

21. A method of trawling which comprises towing a trawling net behind a trawler, causing sound signals to be propagated from the net when the net is filled to a predetermined point, and receiving said signals on said trawler.

22. In fish-catching apparatus, means for causing wave signals to be propagated through the water by the presence of a predetermined amount of fish in the apparatus, and means to receive said signals at a remote point.

23. In fish-catching apparatus, means for causing sound wave signals to be propagated through the water by the presence of a predetermined amount of fish in the apparatus, and means to receive said signals at a remote point.

CLARENCE L. GUYMAN.